UNITED STATES PATENT OFFICE.

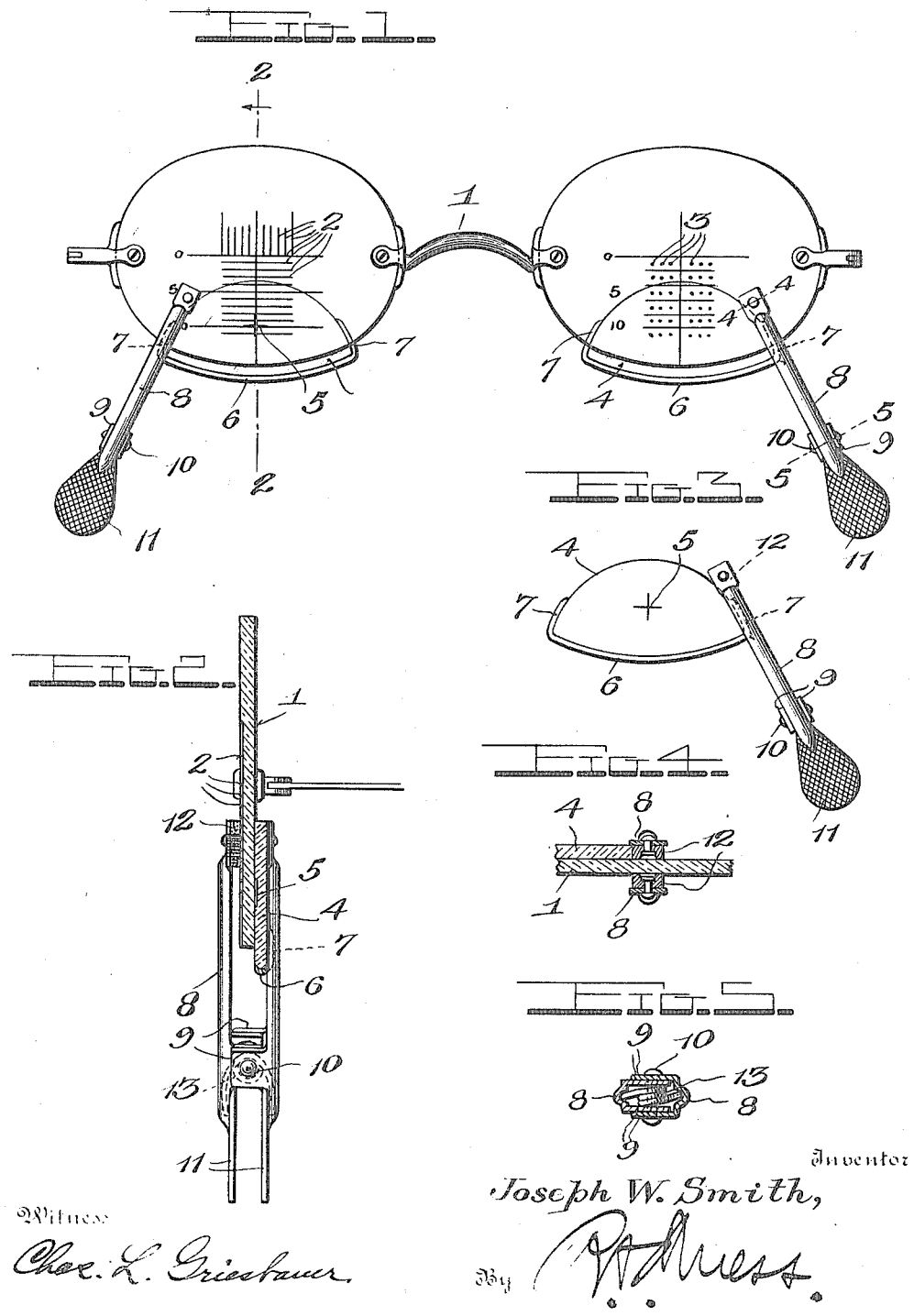

JOSEPH W. SMITH, OF CAMBRIDGE, OHIO, ASSIGNOR OF ONE-HALF TO HOMER E. WHITE, OF COLUMBUS, OHIO.

BIFOCAL DEVICE.

1,263,713.         Specification of Letters Patent.     Patented Apr. 23, 1918.

Application filed March 28, 1917. Serial No. 157,957.

*To all whom it may concern:*

Be it known that I, JOSEPH W. SMITH, a citizen of the United States, residing at Cambridge, in the county of Guernsey and State of Ohio, have invented certain new and useful Improvements in Bifocal Devices, of which the following is a specification.

The present invention relates to certain new and useful improvements in bifocal devices and pertains more particularly to an improved fitting frame, and it has for an object to provide an easily adjustable bifocal segment or reading addition which may readily be positioned against the inner side of the lens, being used by the patient, to facilitate the fitting and quality of a bifocal as well as to locate properly the position the segment is to assume on the usual lens.

The invention further resides in the features of construction, and the arrangements and combinations of parts described in detail in the following specification, succinctly defined in the appended claims, and illustrated in the preferred embodiments in the accompanying drawing wherein—

Figure 1 is a front elevation of a pair of eyeglasses having the present invention applied thereto;

Fig. 2 is a vertical transverse section thereof taken on line 2—2 of Fig. 1;

Fig. 3 is an elevation of the fitting frame, *per se;*

Fig. 4 is a section on line 4—4 of Fig. 1 showing the gripping fingers or jaws in elevation; and Fig. 5 is a detail section of the pivotal connection between the jaws, taken on line 5—5 of Fig. 1.

In the fitting of bifocal lenses, considerable difficulty is experienced in properly locating the reading lenses or segments on the usual lenses of the patient's glasses, some of this difficulty arising through guess work on the part of the oculist, as well as on the part of the patient. The trial frame, usually employed by oculists, consists of a heavy, cumbersome structure which, because of its weight, cuts deeply into fleshy noses and, consequently, the line of vision, while probably correct for the trial frame, would be incorrect for the standard frames for spectacles and eyeglasses which are daily worn and which are of a much lighter weight since the regular or standard frame would not sink as deep into a fleshy nose as the heavier, trial frame.

Therefore, while the segment may have been apparently positioned on the lens at a correct height and location, much cause for complaint by the patient is had because the bifocal segment or wafer is, in fact, incorrectly disposed. If arranged too high, the segment will cut off too much distance view, and if the segment is positioned too low the general complaint is that the patient enjoys comfort while walking but reading is a task since he must hold his head up and book down in order to see at all, and that with discomfort.

Another cause for complaint, resulting from the methods of fitting bifocals employed at the present time, arises from the fact that the trial bifocal wafer or segment is not placed in direct contact with the ordinary lens but has an intervening space which renders the line of vision different from that obtained through the same glasses when the lens and segment contact.

All these disadvantages are done away with by the present invention which broadly consists of a lightly constructed frame adapted to be clamped on the usual lens, or a specially provided lens, and carrying a bifocal wafer, lens or segment in such a manner that the latter will be clamped directly and adjustably against the inner face of the ordinary lens without materially increasing the weight of the latter whereby the exact power of bifocal lens may be positioned directly against the patient's eyeglasses and in the exact position which the patient finds most comfortable.

Referring more in detail to the drawing, the numeral 1 designates a pair of spectacles which in the present instance is especially adapted for the fitting of bifocals and comprises two plain lenses which may be divided preferably by vertical and horizontal hair lines as depicted at 2, or by dots, as at 3 both on the front side of the lens, whereby the position of a bifocal segment 4 may be properly located.

The bifocal segment or reading lens 4 has its axis marked at 5, to facilitate the positioning of the same on the spectacle or eyeglass lens, and is mounted in a substantially dovetail-shaped frame having a curved base 6 and upwardly and inwardly convergent terminal arms 7 of channeled construction, preferably, so that the segment may be set thereinto. One arm 7 is fixedly mounted on one of a pair of jaws 8 that, for lightness in construction, are longitudinally ribbed or corrugated and have inturned ears 9 by which a pin 10 may pivotally connect said jaws. The outer end of each jaw is broadened to form a finger hold 11 while the inner end is extended beyond the point of mounting the segment and has riveted, or otherwise secured, to the inner side thereof a soft gripping face 12 of rubber, felt or the like. The gripping faces of the pair of jaws oppose each other and are urged to closed position by the spring 13 which coils about the pivot pin 10 and has its terminal seating in the corrugations of said jaws, as depicted in Figs. 2 and 5.

In practice, the bifocal device is clamped against the inner face of the ordinary lens, which latter may or may not be marked as above indicated, and the patient can then read through the correctly positioned bifocal lens and look through the usual lens to test the location as well as the power of the lens. The position may then be noted by the oculist and the proper bifocal segment cemented accordingly on the inner face of the patient's lens.

The bifocal segments may be made both of clear and colored glasses and in all forms, double convex, periscopic, flat and toric. They need never to be touched and will thereby remain clean, the gripping jaws being sufficiently large to permit of the operator moving the segments bodily, vertically and horizontally, as well as in a pivotal manner about the gripping faces 12. The gripping jaws are angularly related to the segment so as to obtain perfect balance, and the gripping face 12 of the jaw supporting the bifocal lens lies flush with the latter. The gripping jaws may be properly numbered according to the power, size, type and other characteristics of the bifocal lens, and the bifocal devices arranged in sets or groups.

The bifocal devices may also be used as reading glasses, the user removing them when not desiring to read and thereby obtain the full view through the ordinary lens.

The finish and material of the frame may be such as the manufacturer desires, and such other changes as fall within the scope of the appended claims resorted to in the manufacture of the devices.

The term "eyeglasses" has here been used in its broadest meaning to include spectacles and the like.

What is claimed is:

1. In combination with a pair of eyeglasses having graduations on each glass, of a pair of bifocal-fitting devices removably secured to the glasses and each provided with a mark for association with the glass graduations to determine the position of the devices on the glasses.

2. A bifocal attachment for eyeglasses, comprising a lens having its lower edge of substantially the same curvature as that of the eyeglass, a frame for the lens secured to the lower edge of the lens and having upturned terminal arms embracing the edges of the lens, and means secured to one upturned arm of the frame for attaching the lens to the eyeglass.

3. A bifocal attachment for eyeglasses comprising a lens-carrying frame, and a pair of jaw members pivotally connected between their ends to provide outwardly projecting handles at one end, the frame secured to the inner edge of the opposite end of one member, and a yieldable gripping face for the latter end of said frame-carrying member for spacing the latter from the eyeglass to permit of a lens being carried by the frame in contact with the eyeglass.

4. A bifocal device comprising a pair of bar-like members each having a pair of parallel ears located between its ends, means pivotally connecting the ears of the bars, and a lens secured to an end of one of the members.

5. In a bifocal device, a pair of bar-like members formed of sheet metal and longitudinally corrugated, one end of each member being flattened out to form a handle and the opposite end provided with a jaw face, said members having inturned pairs of opposing ears adjacent the handles, a pivot pin passing through the ears for pivotally connecting the members, a spring extending about the pin and seating in the corrugations of the members to yieldably close the jaw faces, and a lens secured to one member adjacent its jaw face.

6. In a bifocal device, a pair of bar-like members formed of sheet metal and longitudinally corrugated, one end of each member being flattened out to form a handle and the opposite end provided with a jaw face, said members having inturned pairs of opposing ears adjacent the handles, a pivot pin passing through the ears for pivotally connecting the members, a spring extending about the pin and seating in the corrugations of the members to yieldably close the jaw faces, and a lens frame attached to one member adjacent its jaw face.

7. In a bifocal device, a pair of bar-like members formed of sheet metal and longitudinally corrugated, one end of each member being flattened out to form a handle and the opposite end provided with a jaw face, said members having inturned pairs of opposing ears adjacent the handles, a pivot pin passing through the ears for pivotally connecting the members, a spring extending about the pin and seating in the corrugations of the members to yieldably close the jaw faces, and means for securing a lens to one member between its jaw face and its ears.

8. In a bifocal device, a pair of yieldably closed jaws, a lens frame having a base and upturned and inwardly directed terminal arms one of which latter is secured to one jaw between its ends, the inner end of said jaw being provided with a jaw face beyond the attached terminal arm.

9. In a bifocal device, a lens holder, a manipulating handle thereto and extending downwardly and outwardly therefrom at an obtuse angle, and means for removably securing the handle to an eyeglass for pivotal movement.

10. A bifocal fitting device comprising a pair of jaws pivotally connected between their ends to provide operating handles at one end, and gripping faces at the opposite end, and a bifocal lens support carried by the latter end of one jaw.

In testimony whereof I affix my signature.

JOSEPH W. SMITH.